United States Patent [19]

Takasuka et al.

[11] Patent Number: 5,134,803
[45] Date of Patent: Aug. 4, 1992

[54] METHOD OF CULTIVATING CUT FLOWER OF ROSE

[75] Inventors: Chozo Takasuka; Teiji Yokota, both of Ehime; Masaru Suematsu, Saitama, all of Japan

[73] Assignee: Taiyo Kogyo Co. Ltd., Tokyo, Japan

[21] Appl. No.: 695,454

[22] Filed: May 3, 1991

[30] Foreign Application Priority Data

Jun. 7, 1990 [JP] Japan .................... 2-60455

[51] Int. Cl.⁵ .............. A01B 79/00; A01C 1/00; E04H 17/00
[52] U.S. Cl. .............................. 47/58; 47/4; 47/DIG. 6; 256/20
[58] Field of Search ............. 47/4, 5.5, 7, 58, DIG. 6; 256/20

[56] References Cited

U.S. PATENT DOCUMENTS

| 591,716 | 10/1897 | Young | 256/20 |
| 719,605 | 2/1903 | Neil | 256/20 |
| 2,672,710 | 3/1954 | Seiders | 47/6 |
| 2,988,850 | 6/1961 | Hechinger | 256/20 |

FOREIGN PATENT DOCUMENTS

| 0895350 | 1/1982 | U.S.S.R. | 47/4 |
| 1510775 | 9/1989 | U.S.S.R. | 47/7 |

OTHER PUBLICATIONS

Gault, et al. 1971. "*The Dictionary of Roses in color.*" Rainbird Reference Books Ltd. London Section XXI. 7 pages.
Bailey. 1935. "*The Standard Cyclopedia of Horticulture.*" MacMillan Co., London. Pp. 2981-2983.
"*All About Roses.*" 1983. Ortho Books, Chevron Chemical Co., San Francisco, California. Pp. 48-49.
"*All About Pruning.*" 1973. Ortho Books, Chevron Chemical Co. San Francisco, California. Pp. 69-72.
"*How to Care for Shrubs & Hedges.*" Ortho Books, Chevron Chemical Company, San Francisco, California. Pp. 46-47.

Primary Examiner—Howard J. Locker
Attorney, Agent, or Firm—Fleit, Jacobson, Cohn, Price, Holman & Stern

[57] ABSTRACT

The invention relates to cultivation of a rose plant in a greenhouse and the like which is capable of growing a rose so that an object twig with a flower can be cut in about a waist-high position, and picking cut flowers with long stems and of a high quality. In the invention, initially grown twigs are bent in the vicinity of the plant foot and kept prostrated, and basal shoots coming out from the position near said foot are grown into twigs. Then, the twigs with flowers are cut off at the base portion thereof to obtain the initial cut flowers.

3 Claims, 3 Drawing Sheets

FIG. 1A
FIG. 1B
FIG. 1C
FIG. 1D
FIG. 1E
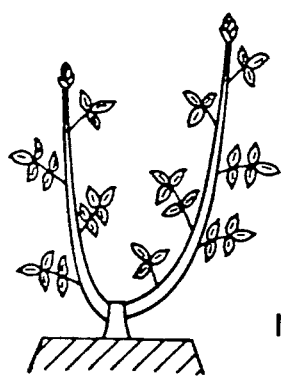
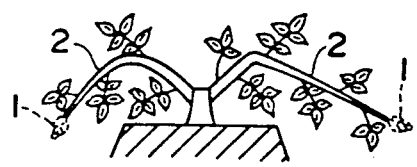
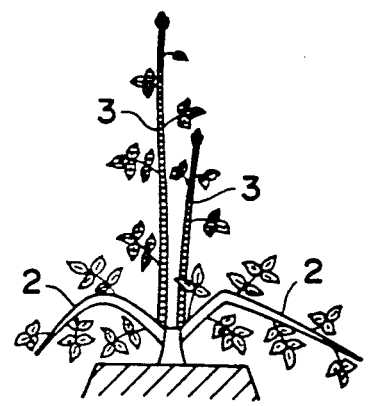
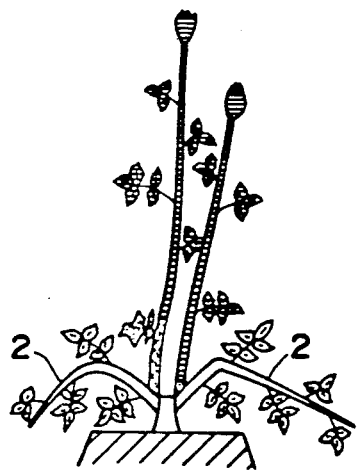
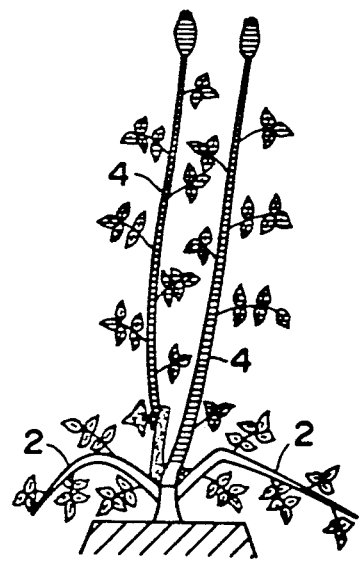

METHOD OF CULTIVATING CUT FLOWER OF ROSE

BACKGROUND OF THE INVENTION

The present invention relates to a method and system of cultivating a rose plant in a greenhouse or a vinyl plastic hothouse so as to obtain cut roses.

A conventional method of cultivating a rose plant will now be described in brief with reference to FIGS. 5A-5E.

When usually 30-40 days have elapsed after a rose seedling is planted, soy bean-sized buds are formed as shown in FIG. 5A. The twigs with these buds and one to two upper leaves thereon are then pinched as shown by broken lines in FIG. 5B. New shoots then come out from the nipped ends of the twigs. However, even if these shoots are grown into twigs, the twigs are too thin and short to be used as twigs with flowers since the mother twigs are thin and have few leaves left thereon. FIG. 5C shows such condition. Therefore, these twigs must be also pinched as shown by broken lines in FIG. 5D. Consequently, twigs with flowers are obtained after twig pinching operations are carried out at least twice, as shown by 5E. However, in an initial period of cultivation of a rose, the length of the twigs cut off is small because many leaves must be left on the stem, or plant foot, of the rose, and high quality cut flowers having a long stem cannot be obtained.

After a first flower-bearing twig nipping operation for flower harvesting is completed, the number of new shoots coming out from the remaining twigs increases. Accordingly, a twig setting operation, in which unnecessary new shoots are removed, has been carried out with much labor, so as to prevent the growth of only such cut flowers that have a small thickness and a small length. When a twig with a flower is cut, two or three five-blade leaves are always left thereon. Consequently, the height of the rose increases gradually, so that the height of the positions for the twig nipping operation in which the twigs with flowers are cut off increases correspondingly, this lowers the efficiency of a twig cutting operation. Therefore, it becomes necessary to reduce the height of the twigs by pruning the same.

The conventional rose cultivating method described above is a rose height increasing tall training method in which the pinching of an upper portion of a twig with a bud and one or two leaves and the cutting of a grown twig with a flower are done with the lower portions of the twigs with the leaves thereon left as they are, to put forth a terminal bud and grow the twig by utilizing apical dominance, that is, the inherent property of a plant such as a rose, whereby a position in which a twig with a flower is cut is heightened. Therefore, it takes much time and labor to remove side buds (lateral buds) and cut a twig with a flower, so that the operation efficiency becomes low. The pruning of twigs is done at least once a year so as to decrease the tree height of the rose, and, therefore, the cutting of a twig with a flower is limited to six or seven times a year at most. The tall training method hampers the passage of sunlight through twigs to cause the unevenness of temperature of the cultivation bed and variations in the environmental conditions in the greenhouse. Since the lengths of stems differ about 20 cm to about 80 cm, much time is required to carry out a flower selection operation (flower grading), and it is necessary that the twigs and buds be thinned out or pinched.

SUMMARY OF THE INVENTION

An object of the present invention is to provide a rose cultivating method capable of growing a rose so that an object twig with a flower can be cut in about a waist-high position at the highest, and picking cut flowers with long stems and of a high quality continuously with little effort.

To achieve this object, the present invention provides a method of cultivating a plant, comprising the steps of nipping the buds only on initially grown twigs in an initial period of cultivation of a rose, forcibly bending the resultant twigs at the portions thereof which are in the vicinity of the plant foot of the rose and maintaining the bent twigs in a prostrated state, growing basal shoots which come out from the portion of the rose which is in the vicinity of the plant foot thereof into twigs, cutting off the resultant twigs with flowers at the base portions thereof, growing, after the initial cut flowers are obtained, the shoots coming out from the cut ends of the remaining twigs and newly coming out basal shoots into twigs with all the uncut twigs bent and kept prostrated, cutting off the resultant grown twigs with flowers at the base portions thereof, and thereafter repeating the twig prostrating, shoot growing and grown twig cutting operations.

If only a bud on an initially grown twig is taken off with the same twig then bent intentionally at the portion thereof which is in the vicinity of the plant foot of the rose, and kept prostrated, the plant foot gets much sunshine to promote the generation of a basal shoot and the favorable growth thereof. This allows a grown twig with a flower to be cut off at the base portion thereof without any trouble, so that a cut flower with a long stem is obtained.

If all the twigs that bear flowers to be thinned are bent and kept prostrated in a logdging state after an initial cut flower is cut off, the portion of the rose which is in the vicinity of the plant foot thereof gets much sunshine as mentioned above, to promote the generation of a shoot at the end of a twig at which a twig with a flower was previously cut off, and the generation of a new basal shoot at the portion of the rose which is in the vicinity of the root thereof as well as the favorable growth of such shoots. In this case, a twig with a flower may also be cut off at the base portion thereof without any trouble.

These operations are thereafter carried out repeatedly, and the twigs with flowers are always cut off at the base portions thereof. This can prevent an increase in the height of a rose.

When the above-described method of cultivating a cut flower of a rose with training of twig at a lower position is conducted by soil cultivation or a general rock wool cultivation, it will take much labor to hold the twigs which have been bent to supporting poles and, in addition, the twigs are not always bent sufficiently with the result that so many side buds or lateral buds grow and, therefore, it is necessary to cut out those side buds with much labor so as to prevent the nutrient translocation to the unnecessary side buds. Further, there is the possibility that the bent twigs are contacted with the ground or soil to cause generation of disease damage, and that the bent twigs possibly narrow the adjacent space or working passage to deteriorate the working efficiency in the greenhouse.

Accordingly, another object of the present invention is to provide a new system for conducting the rose cultivating method which can grow a rose so that an object twig with a flower can be cut in about a waist-high position.

The system has a bench, a rock wool cultivation medium on the bench support rod means on both sides of the bench for holding resilient strings or wires above and along longitudinal sides of the bench so that the twigs that bear flowers to be thinned are bent under, and held by, the resilient wires and kept prostrated in a lodging state.

BRIEF DESCRIPTION OF THE DRAWINGS

FIGS. 1A-1E illustrate in order how to grow twigs of a rose after a rose seeding is planted according to the method of the present invention.

PREFERRED EMBODIMENTS OF THE INVENTION

Figure 2:
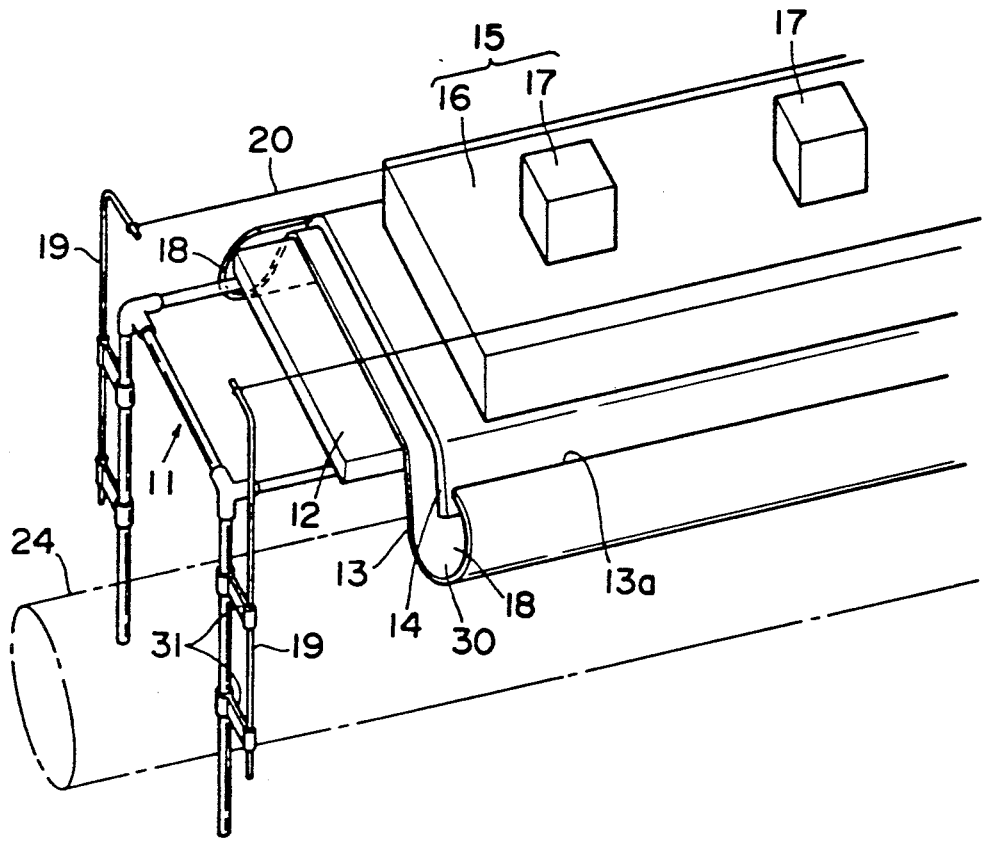
FIG. 2 is a perspective view of a system for carrying out the rose cultivating method shown in FIGS. 1A-1E, for singlethread planting.

The rose cultivating method of the present invention will now be described with reference to a preferred embodiment thereof.

Referring to FIGS. 1A to 1E of the drawing, when usually 30-40 days have elapsed after a rose seedling was planted, a soy bean-sized bud is formed as shown in FIG. 1A, and in the same manner as in a conventional method. The buds 1 only, which are illustrated by broken lines in FIG. 1B, are pinched, and twigs 2 are bent forcibly at the portions thereof which are in the vicinity of a plant foot, and kept prostrated by a suitable means, for example, by binding the twigs 2 to support posts (not shown). However, it is preferable that the twigs 2 are kept prostrated or lodged by using the system of the present invention, which will be described presently with reference to FIGS. 2, 3 and 4. After the twigs 2 are bent and thus fixed, basal shoots came out from the plant foot. The parts shown with narrowly spaced lateral lines in the plant (rose) of FIG. 1C represent twigs 3 grown from these basal shoots. When these twigs 3 are cut off at the base portions thereof, cut flowers with a long stem and of a high quality are obtained. The parts shown with narrowly spaced lateral lines in FIG. 1D represent twigs with flowers, to be cut and parts painted out in black in the same drawing represent the portions to be left after a twig cutting operation.

After the initial twigs with flowers are cut off, all the uncut twigs are bent and kept prostrated. Consequently, shoots come out in a favorable manner at the ends of twigs from which the above-mentioned twigs with flowers have been cut off, and basal shoots newly come out in a favorable manner from the plant foot. The pruning of buds will not be necessary. The shoots coming out from the ends of such cut twigs become as thick and long as the basal shoots. In this case, if the twigs are cut off at the base portions thereof, cut flowers with a long stem and of a high quality are also obtained. The parts painted out in black in FIG. 1E are the same parts painted out in black in FIG. 1D and left after the previous twig cutting operation. The parts 4 shown with narrowly spaced lateral lines represent twigs which are grown from the shoots generated at the ends of the previously cut twigs after the upper part thereof have been cut off as twigs with flowers, and which are to be subsequently cut off at the base portions thereof as twigs with flowers.

These operations are thereafter repeated in the same manner throughout the year.

According to the present invention described above, cut flowers having a long stem and a high quality can be obtained from initially grown twigs, and shoots and basal shoots are thereafter generated in succession from the cut ends of the previously cut twigs, whereby cut flowers having a long stem and a high quality can be obtained throughout the year. Further, the twigs with flowers are cut off always at the base portions thereof, so that the efficiency of a twig cutting operation is very high. Since weak twigs are bent every time such twigs are grown, a power-saving on bud nipping operation can be attained. Moreover this cultivation method need not carry out a twig pruning operation, so that it has no periods of interruption of cultivation. Consequently, twigs with flowers can be obtained nine or ten times a years. This brings a substantially larger income to the cultivator. Since the height of a rose remains low, the rate of utilization of light increases, and this can contribute to maintaining of constant environmental conditions in a hothouse.

In addition to the above, cultivation of twigs is carried out uniformly, and the length of the stems becomes constant, so that no special flower selecting operation is required. It is unnecessary to cut off twigs with flowers, with around two five-blade leaves left on the base portions of the remaining parts of the twigs. Accordingly, a twig with a flower, which is cut to 70 cm according to a conventional method, can be cut to 80 cm, so that a cut flower with a long stem can be obtained.

Figure 3:
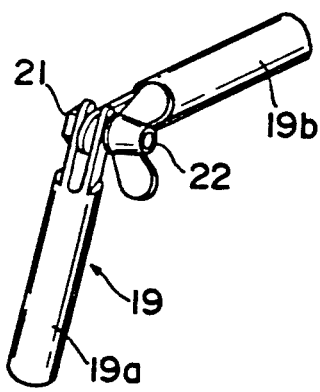
FIG. 3 is a perspective view of supporting poles in the system shown in FIG. 2.

Referring to FIGS. 2 and 3 which show the system for carrying out the rose cultivating method shown in FIGS. 1A to 1E, the system for single-thread (or single row) planting has a bench 11 having a height of about 50 cm which is assembled with a plurality of pipes and points as illustrated. A plate 12 is placed on the bench 11 to provide a flat surface, on which a synthetic resin sheet 13 and a non-woven fabric sheet 14 are placed. On the non-woven fabric sheet 14 a rock wool culture medium 15 formed with a rock wool bed 16 and a rock wool pot 17 on the bed 16 is placed as illustrated. The synthetic resin sheet 13 is bent at its opposed ends to form semi-circular grooves 18 extending along the length of the bench 11, and adhered at its ends 13a to the non-woven fabric 14 so that the semi-circular grooves 18 maintain their shape for servicing as drain passages 30. Though not illustrated for simplification only, a drip irrigation device which is known in the art is used to supply a nutrient liquid to the rock wool pot 7. An excess nutrient liquid is collected at the drain passages 30 for recovery through the non-woven fabric sheet 14. Thus, it is preferred that the non-woven fabric sheet extends at its ends fully into a semi-cylindrical space confined by bending the ends of the synthetic resin sheet 13 so that the excess nutrient liquid can drop into the drain passages 30 without fail.

Supporting poles 19 are disposed at the opposite sides of the bench 11, by means of suitable arms 31 as illustrated in FIG. 2, or by directly inserting into the soil of the ground. Between the supporting poles 19 on both sides of the bench 11, an extensible string or wire 20 of an extensible and resilient material, partly or entirely, are installed in an extensible manner. The wire 20 can be formed with longitudinal combination of an extensible and non extensible strings or wires so that pulling of the wire by manipulation at any portion of the wire 20 causes extension of the wire, and the wire can be retracted to its original position when the pulling force is released. Accordingly, it is quite easily carry out an operation of bending the twigs below the wire and holding the bent twigs in a crossing posture with respect to the wire 20.

The strength for keeping the twigs in a prostrated posture is determined by the position of holding the twigs, that is, the position of the wires 20. Thus, it is desired that the position of the wires can be changed selectively. In the illustrated embodiment shown in FIG. 2, the supporting pole 9 has two removable two pole portions 19a, 19b which are rotatably coupled to each other by a bolt 21 and a wingnut 22 so that the angle of the upper pole portion 19b can be changed selectively relative to the lower pole portion. Thus, the position of the wire 20 can be readily changed by selectively changing the angle of the two pole portions 19a, 19b. In FIG. 2, reference numeral 24 represent a duct for hot air transportation.

Figure 4:
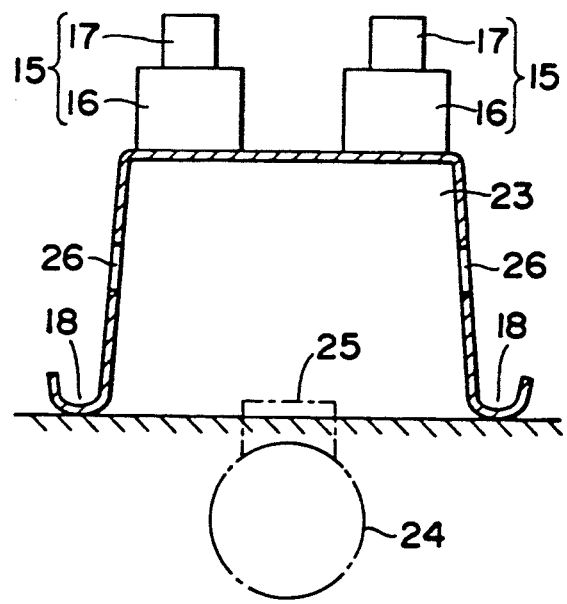
FIG. 4 is a sectional view of a bench in another embodiment of the invention.
Figure 5A:
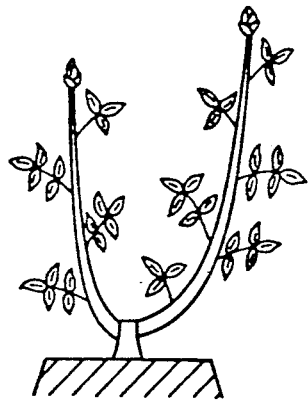
FIGS. 5A-5E are illustrations of a conventional cultivation method.
Figure 5B:
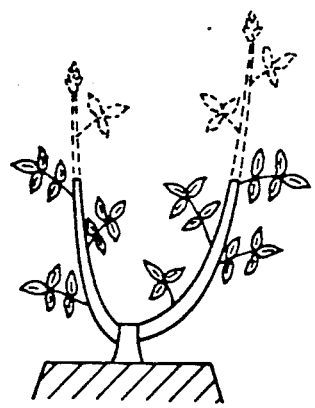
Figure 5C:
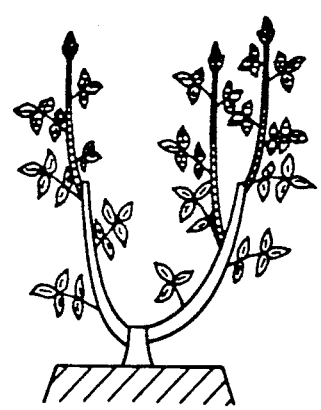
Figure 5D:
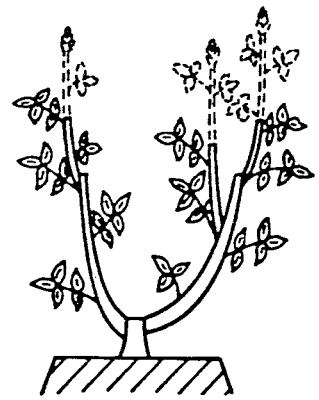
Figure 5E:
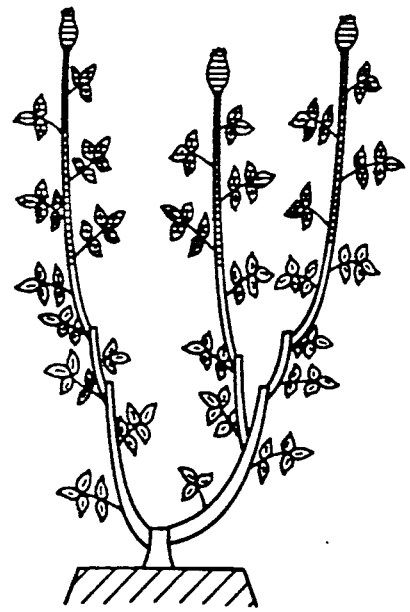

FIG. 4 shows an example of a two-thread planting using a trapezoidal bench 11 with rock wool cultivation media 15 in a two-line configuration. In this embodiment, rock wool cultivation media 15 composed of a rock wool bed 16 and a rock wool pot 17 are placed directly on the trapezoidal bench 15 without using a plate like the plate 12 of the embodiment of FIG. 2. The trapezoidal bench 15 has drain passages 18 at the foot of the both sides thereof, by bending the foot portions as illustrated so that the synthetic resin sheet 13 and the non-woven fabric sheet 14 in the embodiment of FIG. 2 can be omitted. The bench 15 shown in FIG. 4 forms a chamber 23 with respect to the ground. In the embodiment of FIG. 4, a duct 24 for feeding hot air is embodied in the ground so that openings 25 of the duct 24 are located in the chamber 23. Reference numeral 26 represents through-holes for connecting the heated space in the chamber 23 with the outside space of the trapezoidal bench.

According to the system of the invention for the rose cultivating method, the bent twigs can be immediately and effectively held in a prostrated posture. In addition, since the rock wool cultivation media are placed at a higher position by using a bench, the twigs can be bent sufficiently downwardly so that coming out of unnecessary side buds can be reduced. Thus, troublesome and timeconsuming pruning operation can be reduced. Further, the bent twigs are not contacted with the soil or the ground and, accordingly, there is a reduced possibility of generation of disease damage and narrowing of working space or passage on the ground does not occur. The bench of the system can provide a space thereunder, which can be used for placing a duct for feeding various kinds of gas such as air for controlling temperature and/or humidity in the greenhouse or $CO_2$ gas for facilitating photosynthetic activities.

What is claimed is:

1. A method of cultivating a rose plant, to produce high quality flowers comprising the steps of:

nipping off apical buds on initially and naturally grown first twigs of the plant, forcibly bending each of said first twigs downwardly at a portion thereof in the vicinity of the plate foot and maintaining the first twigs in a bent prostrated state, growing basal shoots coming out of the plant in the vicinity of said plant foot into second twigs;

cutting off selected ones of said second twigs with flowers at a basal portion of each selected twig to thereby obtain first cycle cut flowers, forcibly bending down any remaining non-selected second twigs in the vicinity of the plant foot and maintaining the said non-selected second twigs in a bent and prostrated state, growing shoots coming out from cut ends of the selected ones of said second twigs and newly coming out basal shoots to form third twigs, and cutting off selected ones of the third twigs with flowers at a basal portion of each selected third twig to thereby obtain second cycle cut flowers.

2. A method of cultivating rose plant according to claim 1, wherein the twig prostrating, shoot growing and grown twig cutting operations are repeated after cutting off the selected ones of the third twigs.

3. A method of cultivating a rose plant according to claim 1, wherein an extensible wire means is used to bend said twigs in the vicinity of the plant foot under said extensible wire means.

* * * * *